US012663179B2

(12) United States Patent
Fuga Santos et al.

(10) Patent No.: US 12,663,179 B2
(45) Date of Patent: Jun. 23, 2026

(54) HEAT EXCHANGER MODULE AND MOTOR VEHICLE HAVING THE SAME

(71) Applicant: MAHLE INTERNATIONAL GMBH, Stuttgart (DE)

(72) Inventors: Gustavo Fuga Santos, Gerlingen (DE); Nikhil Nimbalkar, Pune (IN); Kiran Pagare, Pune (IN); Patil Pramod, Pune (IN); Hicham Rouhana, Korntal-Münchingen (DE); Amit Gulhane, Maharashtra (IN)

(73) Assignee: MAHLE International GmbH, Stuttgart (DE)

( * ) Notice: Subject to any disclaimer, the term of this patent is extended or adjusted under 35 U.S.C. 154(b) by 161 days.

(21) Appl. No.: 18/380,801

(22) Filed: Oct. 17, 2023

(65) Prior Publication Data

US 2024/0133584 A1 Apr. 25, 2024
US 2024/0230153 A9 Jul. 11, 2024

(30) Foreign Application Priority Data

Oct. 19, 2022 (DE) .......................... 102022211074.9

(51) Int. Cl.
*F24F 13/30* (2006.01)
*B60H 1/00* (2006.01)
(52) U.S. Cl.
CPC ......... *F24F 13/30* (2013.01); *B60H 1/00521* (2013.01)

(58) Field of Classification Search
CPC ........ F28D 9/005; F28D 9/0093; F28F 3/086; F25B 2339/044; F25B 2339/0442; F25B 2339/0444; F25B 2339/0446
See application file for complete search history.

(56) References Cited

U.S. PATENT DOCUMENTS

| | | | | | |
|---|---|---|---|---|---|
| 5,896,834 | A | * | 4/1999 | Gruner | F28D 9/0093 123/196 AB |
| 10,480,871 | B2 | | 11/2019 | Mueller et al. | |
| 2015/0323231 | A1 | * | 11/2015 | Citti | F28D 9/005 62/516 |
| 2016/0091229 | A1 | * | 3/2016 | Eibner | F25B 39/00 165/104.21 |
| 2019/0154366 | A1 | * | 5/2019 | Mueller | F28D 1/03 |
| 2020/0408135 | A1 | * | 12/2020 | Girondi | F01M 5/002 |

FOREIGN PATENT DOCUMENTS

| | | | | |
|---|---|---|---|---|
| DE | 102016007089 | | 6/2017 | |
| DE | 102019210022 | | 1/2021 | |
| DE | 102019210022 | A1 * | 1/2021 | F28F 9/18 |
| EP | 2927631 | | 9/2018 | |

* cited by examiner

*Primary Examiner* — Nelson J Nieves
(74) *Attorney, Agent, or Firm* — Barnes & Thornburg

(57) ABSTRACT

The present invention relates to a heat exchanger module having a collector and a heat exchanger. It is substantial for the invention that on a connecting flange of the collector at least one groove equipped for conducting refrigerant is provided. Further, the invention relates to a motor vehicle having at least one such heat exchanger module.

14 Claims, 3 Drawing Sheets

HEAT EXCHANGER MODULE AND MOTOR VEHICLE HAVING THE SAME

CROSS-REFERENCE TO RELATED APPLICATIONS

Figures 1, 2:
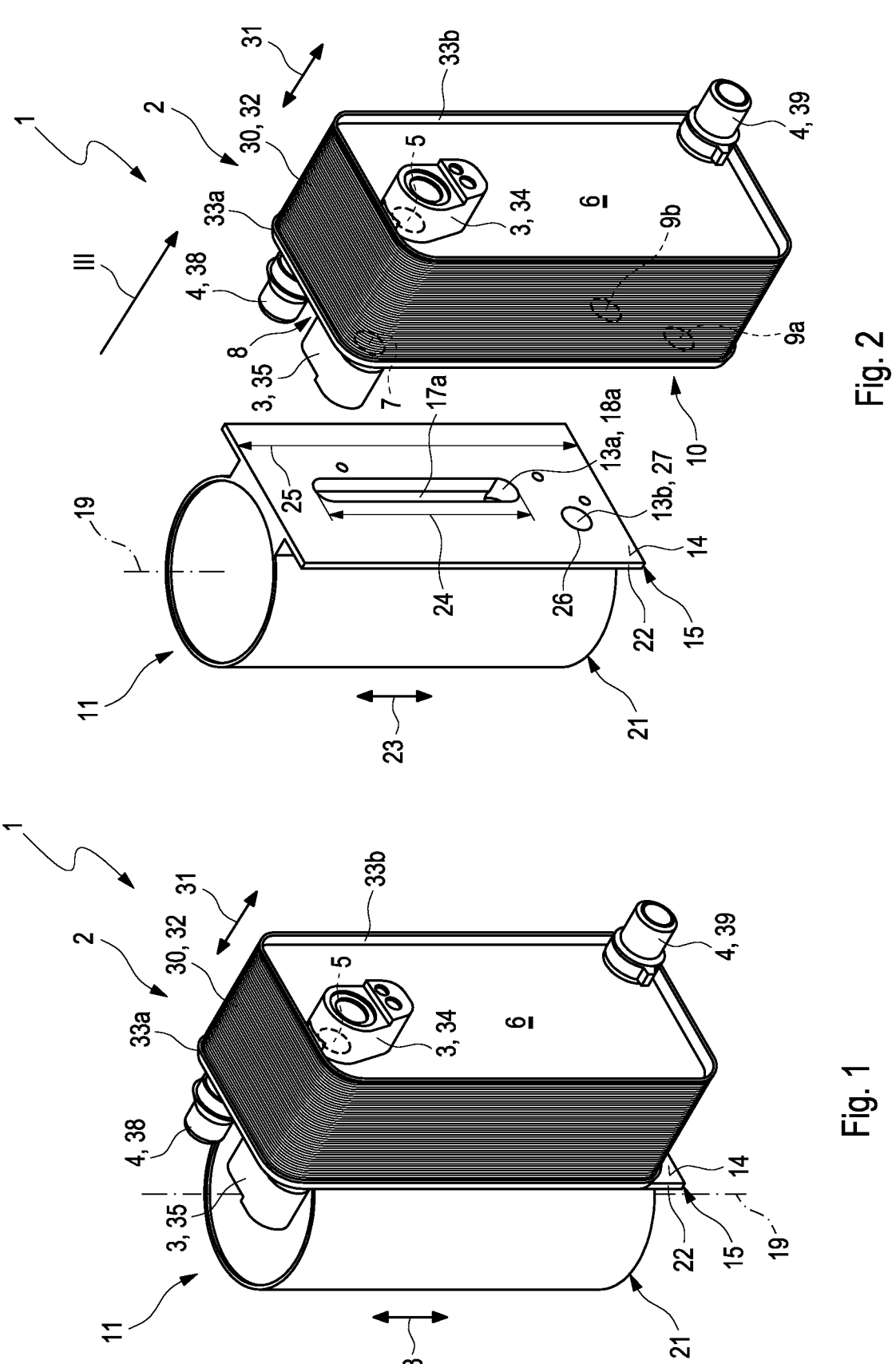

This application claims priority from German Patent Application No. DE 10 2022 211 074.9, filed on Oct. 19, 2022 the entirety of which is hereby fully incorporated by reference herein.

The invention relates to a heat exchanger module according to the preamble of Patent claim 1 and in particular to a motor vehicle having such a heat exchanger module.

Heat exchanger modules of the type mentioned at the outset are known for example from DE 10 2019 210 022 A1 or EP 2 927 631 B1. They are usually constructed at least of a heat exchanger for cooling refrigerant and of a collector for drying and storing refrigerant, wherein the latter is arranged with a connecting flange on a mounting surface of the heat exchanger so that a refrigerant circuit is formed. In order to save costs in the development of new generations of heat exchanger modules, structurally standardised collectors are installed today. However, the mounting surfaces of different types of heat exchangers partly differ substantially so that when with a heat exchanger module a new heat exchanger type is to be installed, a structural adaptation of the collector to the new heat exchanger is generally necessary, which however causes undesirable delays and costs.

The object of the invention therefore consists in providing an improved or at least another embodiment of a heat exchanger module. In particular, a motor vehicle having such a heat exchanger module is to be stated as well.

In the present invention, this object is solved in particular through the subjects of the independent claims. Advantageous embodiments are subject of the dependent claims and of the description. The basic idea of the invention consists in configuring the structural adaptation of a collector to a heat exchanger more flexibly and simpler with the help of grooves.

For this purpose, a heat exchanger module for an air conditioning system or a heat pump system is proposed, which comprises a heat exchanger for cooling refrigerant, which is penetrated by a refrigerant duct for refrigerant and a coolant duct for coolant. Furthermore, the heat exchanger module comprises a collector for drying and storing refrigerant which is penetrated by a storage duct for refrigerant and comprises a connecting flange. In the assembled state of the heat exchanger module, the collector with its in particular integrated connecting flange is supported on the heat exchanger directly or indirectly, for example via a sealing means and the storage duct is connected to the refrigerant duct in a fluidically communicating manner. Because of this, an additional flange that has been necessary to date, for mounting the collector to the heat exchanger, as well as associated fastening and sealing means are no longer required. Accordingly, the invention practically consists in connecting the collector directly, i.e. without additional flange, with the integrated flange/collector, directly to the heat exchanger. It is substantial for the invention that on the connecting flange of the collector at least one groove for guiding refrigerant is provided, which can be dimensioned for example depending on a connecting pattern for the collector preset on the heat exchanger. The said connecting pattern can be preset for example by transfer openings of the refrigerant duct of the heat exchanger. It is practical when the at least one groove in the assembled state of the heat exchanger module is connected to the storage duct and/or the refrigerant duct in a fluidically communicating manner. Because of this, the collector as a whole can be relatively flexibly and cost-effectively adapted to a heat exchanger.

Practically it can be provided that the at least one groove has at least one of the following features:

it is realised by a longitudinal groove, it extends at least in portions or exclusively parallel to a height direction defined by an edge of the connecting flange, it extends at least in portions or exclusively parallel to a height direction defined by an edge of the connecting flange, wherein a groove length running parallel to the height direction of the at least one groove amounts to between 50% to 90% of a height of the connecting flange viewed in the height direction, it extends at least in portions or exclusively at an angle or transversely to a height direction defined by an edge of the connecting flange, it extends parallel to a longitudinal centre axis of the collector.

By way of this, preferred embodiments for such a groove are stated, by way of which a relatively simple adaptation of the collector to a connecting pattern of the heat exchanger is possible.

Further practically it can be provided that on a connecting surface of the collector formed on the connecting flange the storage duct of the collector has collector duct openings. At least one collector duct opening of these collector duct openings is realised by a groove opening of the at least one groove. The at least one groove can open into the connecting surface. By way of this, the storage duct of the collector can be relatively easily adapted to the said connecting pattern.

Practically it can be provided that at least one further collector duct opening of the collector is realised by a circular opening of a bore. The bore can open out to the connecting surface. Practically, the bore can be introduced into the connecting flange of the collector depending on the connecting pattern of the heat exchanger. Accordingly, the connecting flange of the collector has a groove opening out to the connecting surface and a bore likewise opening out to the connecting surface. Alternatively it can be provided that at least one further collector duct opening of the collector is realised by a groove opening of a further groove. The further groove opening can open out to the connecting surface. Accordingly, the connecting flange of the collector has two separate grooves opening out to the connecting surface, which in the following can also be referred to as first groove and second groove. Practically, the first groove and the second groove can be oriented in parallel with respect to a longitudinal centre axis of the collector. Practically it can be provided that the said grooves, i.e. the first and second groove, have at least one of the following features:

they are at least in portions or exclusively parallel to one another, they are different in length, they each extend at least in portions or exclusively parallel to a height direction defined by an edge of the connecting flange, they each extend at least in portions or exclusively parallel to a height direction defined by an edge of the connecting flange, wherein a groove length running parallel to the height direction of the one, first groove amounts to more than 70% of a height of the connecting flange viewed in the height direction, wherein a groove length of the other, second groove running parallel to the height direction amounts to less than 70% of a height of the connecting flange viewed in the height direction, they extend at least in portions or exclusively at an angle or transversely to a height direction defined by an edge of the connecting flange.

Thus, preferred embodiments for the said grooves are stated, by way of which a relatively simple adaptation of the collector to a connecting pattern of the heat exchanger is possible.

Further practically it can be provided that at least one structural dimension of the at least one groove, in particular a groove length and/or a groove width, is realised depending on a connecting pattern of the heat exchanger. The connecting pattern can be realised by a transfer opening of the refrigerant duct opening out to a mounting surface of the heat exchanger equipped for mounting the collector. As a result, the collector can thus be relatively easily adapted to the connecting pattern of the heat exchanger.

Furthermore, it can be provided that in the assembled state of the heat exchanger module, at least one further groove forms an outlet groove of the collector fluidically communicating with the refrigerant duct of the heat exchanger, through which refrigerant can flow out of the refrigerant duct of the heat exchanger.

Practically it can be provided that the heat exchanger comprises a stack of plate discs stacked on top of one another in a stack direction, wherein the at least one groove or both grooves run orthogonally to the stack direction and parallel to a longitudinal centre axis of the collector. Thus, the collector can be relatively easily adapted to the connecting pattern of the heat exchanger.

According to a further basic idea of the invention it is provided that a motor vehicle having an air-conditioning system or a heat pump system is equipped with at least one heat exchanger module according to the above description.

It should be mentioned, furthermore, that by the term "groove" the invention, practically means a longitudinal recess. Furthermore, by a connecting pattern of a heat exchanger, the invention practically means a pattern of openings on an mounting surface of the heat exchanger equipped for mounting the collector, which is defined by transfer openings of the refrigerant duct opening out on the mounting surface of the heat exchanger and the positions of the same on the mounting surface relative to one another.

Practically it can be provided that the heat exchanger is realised in a stacked plate design. Furthermore, the heat exchanger can be realised by a condenser or an evaporator.

Further important features and advantages of the invention are obtained from the subclaims, from the drawings and from the associated figure description by way of the drawings.

It is to be understood that the features mentioned above and still to be explained in the following can not only be used in the respective combination stated but also in other combinations or by themselves without leaving the scope of the present invention.

Preferred embodiments of the invention are shown in the drawings and are explained in more detail in the following description, wherein same reference numbers relate to same or similar or functionally same components.

It shows, in each case schematically

Figures 3, 4:
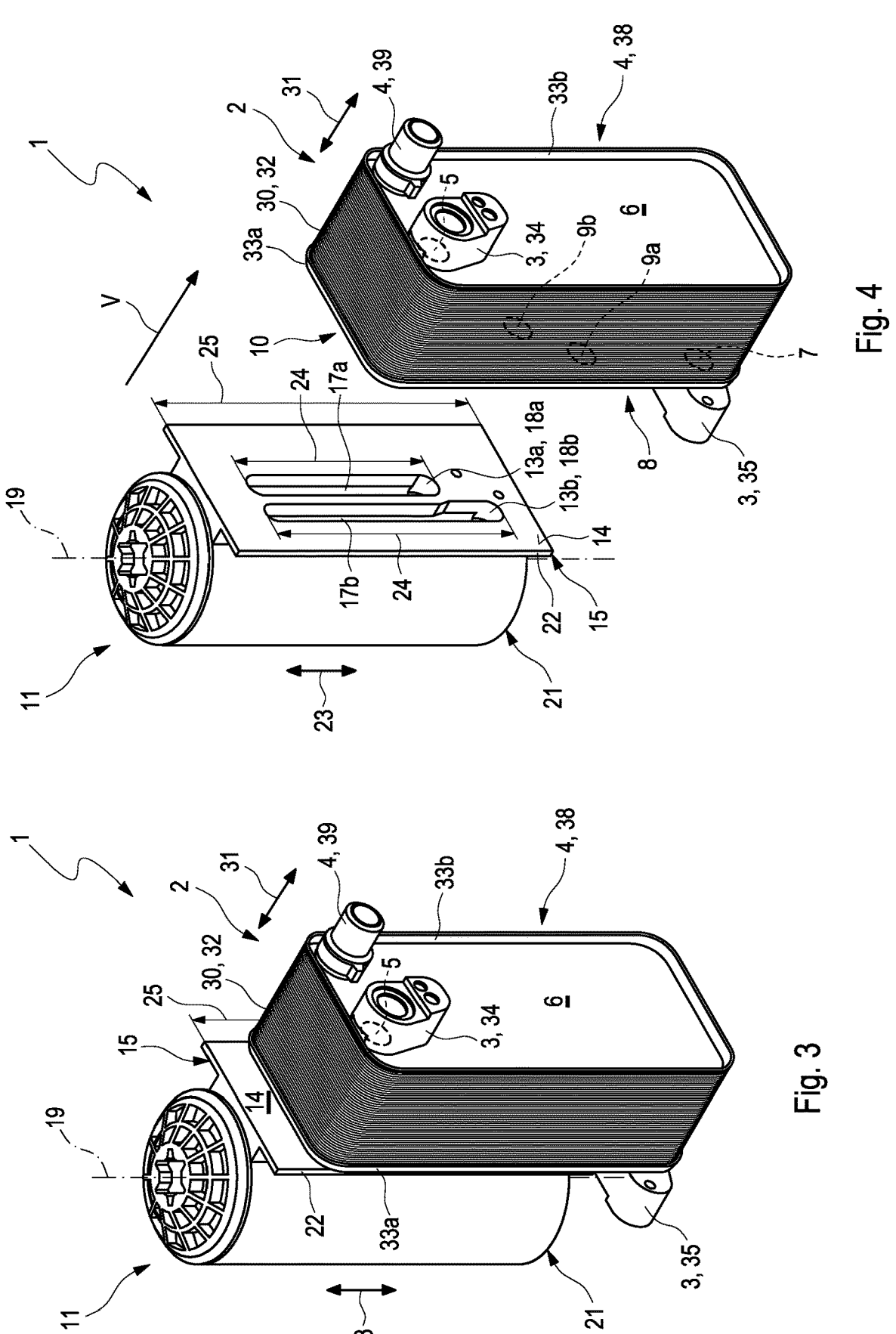
Figures 5, 6:
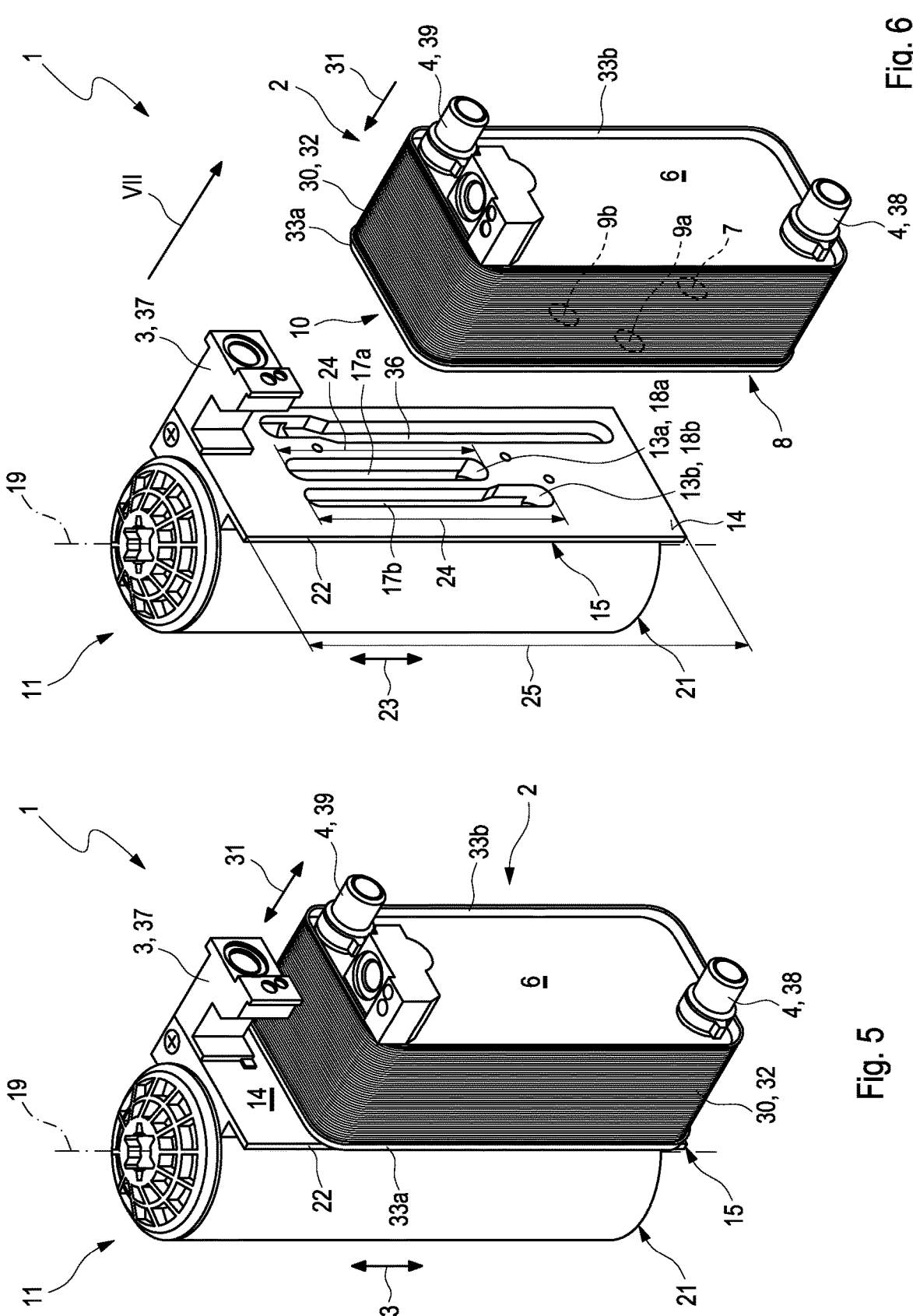

FIG. 1 a perspective view of an embodiment of a heat exchanger module according to the invention in the assembled state, FIG. 2 a perspective view of the heat exchanger module from FIG. 1, wherein for better recognisability of a connecting flange of a collector of the heat exchanger module, a heat exchanger of the heat exchanger module is lifted off the collector in the direction of an arrow III, FIG. 3 a perspective view of a further embodiment of a heat exchanger module according to the invention in the assembled state, FIG. 4 in a perspective view, the heat exchanger module from FIG. 3, wherein for better recognisability of a connecting flange of a collector of the heat exchanger module, a heat exchanger of the heat exchanger module is lifted off the collector in the direction of an arrow V, FIG. 5 a perspective view of a further embodiment of a heat exchanger module according to the invention in the assembled state, FIG. 6 in a perspective view, the heat exchanger module from FIG. 5, wherein to better recognise a connecting flange of a collector of the heat exchanger module, a heat exchanger of the heat exchanger module is raised off the collector in the direction of an arrow VII.

FIGS. 1 to 6 show embodiments of a heat exchanger module marked in totality with the reference number 1, which can be employed for example in an air-conditioning system or a heat pump system. In the illustrations according to FIGS. 1 to 6, the heat exchanger module 1 has a heat exchanger 2 realised in stacked plate design for cooling refrigerant and a collector 11 described further down below for drying and storing refrigerant.

The heat exchanger 2, which can be for example a bought-out part and be realised by a condenser or an evaporator, comprises two base plates 33a, 33b arranged opposite one another and a stack 30 of individual plate discs 32 stacked onto one another in a stack direction 31. The said stack 30 is arranged in the stack direction 31 between a first base plate 33a of these base plates 33a, 33b connected to the stack 30 and a second base plate 33b of these base plates 33a, 33b likewise connected to the stack 30. Furthermore, the heat exchanger 2 is penetrated by a refrigerant duct 3 for refrigerant and a coolant duct 4 for coolant which are formed by hollow spaces formed between the plate discs 33 that are fluidically connected to one another which are not illustrated. The refrigerant duct 3 and the coolant duct 4 are routed past one another in the heat exchanger 2 in a manner knows per se so that heat energy can be transferred from the refrigerant to the coolant or vice versa. The coolant duct 4 can be supplied with coolant via a coolant inlet connector 38 arranged in FIGS. 1 to 4 on the first base plate 33a and in FIGS. 5 and 6 on the second base plate 33b and a coolant outlet connector 39 uniformly arranged in FIGS. 1 to 6 on the second base plate 33b. For example, supply hoses that are not illustrated can be connected to the coolant inlet connectors 38 and the coolant outlet connectors 39 in order to realise the supply with coolant. The refrigerant duct 3, forming an inlet opening 5 for the inflow of refrigerant into the refrigerant duct 3 opens out on a first duct outlet surface 6 of the heat exchanger 2 formed on the second base plate 33b. Purely exemplarily, an inlet connector 34 communicating via the inlet opening 5 with the refrigerant duct 3 is arranged there, on which for supplying the refrigerant duct 3 with refrigerant, a supply hose that is not illustrated can be connected. According to FIGS. 1 to 4, the inlet connector 34 is embodied as a straight connector and according to FIGS. 5 and 6 as a 90° angular connector, so that the said supply hose can be arranged on the inlet connector 34 either in the direction of the stack direction 31 or transversely thereto. Furthermore, the refrigerant duct 3, forming an outlet opening 7 for the outflow of refrigerant from the refrigerant duct 3, opens out on a duct outlet surface 8 of the heat exchanger 2 formed by the first base plate 33*a*. There, an outlet connector 35 communicating with the refrigerant duct 3 via the outlet opening 7 can be arranged, on which a supply hose that is again not shown can be mounted, see FIGS. 1 to 4. The refrigerant duct 3, furthermore, forming so-called transfer openings 9*a*, 9*b*, which are merely drawn in in FIGS. 2, 4 and 6, opens out on a third duct outlet surface of the heat exchanger 2 referred to as mounting surface 10 equipped for mounting the collector 11. The mounting surface 10 is formed by the first base plate 33*a* and practically configured separately with respect to the second duct outlet surface 8. The transfer openings 9*a*, 9*b* opening out on the mounting surface form a connecting pattern that is characteristic for the heat exchanger 2.

The said collector 11, which with respect to the heat exchanger 2 forms a separate component, is equipped for drying and storing refrigerant. For this purpose, it comprises, inter alia, a roughly round-cylindrical collector housing 21 defining along its extension a longitudinal centre axis 19 and a connecting flange 15 arranged thereon with a flat connecting surface 14 facing away from the collector housing 21. With a side opposite the connecting surface 14, the connecting flange 15, which exemplarily has a substantially cuboid body, is integrally arranged on the collector housing 21, and oriented tangentially with respect to the curved outer surface of the collector housing 21. Furthermore, the collector 11 comprises a storage duct for refrigerant which is not illustrated in the figures, which can store and dry a predetermined volume of refrigerant. The storage duct penetrates the collector housing 21 and the connecting flange 15, wherein according to the embodiments illustrated in FIGS. 1 to 6, forming two separate collector duct openings 13*a*, 13*b*, it opens out on the connecting surface 14 of the connecting flange 15.

In the assembled state of the heat exchanger module 1, the collector 11 with its connecting surface 14 is supported on the mounting surface 10 of the heat exchanger 2 directly or, for example by way of a sealing means connected in between which is not illustrated, indirectly on the mounting surface 10 of the heat exchanger 2. Thus, the first base plate 33*a* faces the collector 11 while the second base plate 33*b* faces away from the collector 11. Further, the collector 11 can be non-detachably fixed to the heat exchanger 2 by soldering, so that the collector 11 and the heat exchanger 2 form an easy-to-handle unit. Practically, the heat exchanger 2 and the collector 11 are placed on top of one another so that the collector duct openings 13*a*, 13*b* of the collector 11 and the transfer openings 9*a*, 9*b* of the heat exchanger 2 are located opposite one another, so that they, or the refrigerant duct 3 and the storage duct are fluidically connected to one another. Thus, the refrigerant duct 3 of the heat exchanger 2 and the storage duct of the collector 11 form a closed refrigerant circuit, in which the refrigerant can flow from the heat exchanger 2, for example via the one transfer opening 9*a* and the one collector duct opening 13*b* to the collector 11 and from the collector 11 for example via the other transfer opening 9*b* and the other collector duct opening 13*a*, back to the heat exchanger 2.

It is now substantial that at least one collector duct opening 13*a*, 13*b* of the collector 11 is formed by a groove opening 18*a*, 18*b*, which in turn is realised by a groove 17*a*, 17*b* opening out to the connecting surface 14 of the connecting flange. In order to adapt in a relatively simple manner the at least one collector duct opening 13*a*, 13*b* of the collector 11 to a connecting pattern of the heat exchanger 2 specified for example by the manufacturer, at least one structural dimension of the groove 17*a*, 17*b*, for example a groove length 24 and/or a groove width, can be defined depending on the connecting pattern of the heat exchanger 2 realised on the mounting surface 10 by the transfer openings 9*a*, 9*b* opening out there. For example, the groove 17*a*, 17*b* can be realised by mechanically working the connecting flange 15 within the scope of the manufacture of the collector 11 or, if applicable, during the assembly of the heat exchanger module 1.

With respect to the embodiment illustrated in FIGS. 1 and 2 it must be explained that exactly one single collector duct opening 13*a* of the collector 11 is realised by a groove opening 18 of a groove 17*a* opening out to the connecting surface 14. The groove 17 is realised by a longitudinal groove which extends parallel to a height direction 23 defined by an edge 22 of the connecting flange 15. A groove length 24 of the groove 17*a* running parallel to the height direction 23 amounts to between 50% to 90% of a height 25 of the connecting flange 15 viewed in the height direction 23. The groove 17*a* runs with respect to the stack direction 31, orthogonally and with respect to the longitudinal centre axis 19 of the collector 11, in parallel. In the assembled state of the heat exchanger module 1, the groove 17*a* is practically sealed in a fluid-tight manner by the heat exchanger 2 or for example by way of a sealing means connected in between, so that refrigerant, via the grooves 17*a*, can flow to and fro between the heat exchanger 2 and the collector 11, without undesirable leakages developing in the region between collector 11 and heat exchanger 2. The further collector duct opening 13*b* of the collector 11 according to the embodiment in FIGS. 1 and 2 is realised by a circular opening 27 of a bore 26 opening out to the connecting surface 14. The collector 11 is thus cost-effectively adapted to a connecting pattern of the heat exchanger 2 from FIGS. 1 and 2 specified by the manufacturer.

Deviating from this, it is provided according to the embodiments of the heat exchanger module 1 illustrated in FIGS. 3 to 6 that the collector duct openings 13*a*, 13*b* of the collector 11 are each realised by a groove opening 18*a*, 18*b* of grooves 17*a*, 17*b* opening out to the connecting surface 14. The two grooves 17*a*, 17*b* are exemplarily realised by longitudinal grooves and extend each parallel to a height direction 23 defined by an edge 22 of the connecting flange 15. Here, the two grooves 17*a*, 17*b* are embodied different in length in the manner that a groove length 24 of the first groove 17*b* running parallel to the height direction 23 amounts to more than 70% of a height 25 of the connecting flange 15 viewed in the height direction 23 and that a groove length 24 of the second groove 17*a* running parallel to the height direction 23, amounts to less than 70% of a height 25 of the connecting flange 15 viewed in the height direction 23. Furthermore, the grooves 17*a*, 17*b*, each run, with respect to the stack direction 31, orthogonally and with respect to the longitudinal axis 19 of the collector 11, in parallel. Practically, the two grooves 17*a*, 17*b* are flowed through by refrigerant in counterflow during the operation of the heat exchanger module 1, in order to achieve an improved transfer of heat energy. In the assembled state of the heat exchanger module 1, the grooves 17*a*, 17*b* are practically sealed in a fluid-tight manner by the heat exchanger 2 or for example by way of a sealing means connected in between, so that refrigerant can flow to and fro between the heat exchanger 2 and the collector 11 via the grooves 17*a*, 17*b*, without undesirable leakages developing in the region between collector 11 and heat exchanger 2.

The embodiment according to FIGS. 5 and 6 differs from the preceding embodiments, furthermore, in particular in that the refrigerant duct 3 is fluidically connected via the outlet opening 7, not with an outlet connector 35 but with an outlet groove 36 of the collector 11 introduced into the connecting flange 15 and opening out to the connecting surface 14, which, here, is configured parallel in portions with respect to the grooves 17*a*, 17*b*. Thus, the outlet connector 35 for the refrigerant duct 3 is no longer required on the first base plate 33*a*. In the assembled state of the heat exchanger module 1, the outlet groove 36 is practically sealed in a fluid-tight manner by the heat exchanger 2 or for example by way of a sealing means connected in between, so that refrigerant from the refrigerant duct 3 can flow through the outlet opening 7 into the outlet groove 36 without undesirable leakages developing in the region between collector 11 and heat exchanger 2. The outlet groove 36, furthermore, is fluidically connected to a collected outlet connector 37 of the collector 11, which is exemplarily arranged on the connecting surface 14 and connected to the connecting flange 15. As a result, refrigerant can thus flow out of the refrigerant duct 3 via the outlet opening 7, the outlet groove 36 of the collector 11 and via the collector outlet connector 37. In practice, a supply hose which is not illustrated here can be arranged on the collector outlet connector 37 in order to discharge the refrigerant.

The specification can be readily understood with reference to the following Numbered Paragraphs:

Numbered Paragraph 1. A heat exchanger module (1) for an air-conditioning system or a heat pump system, having a heat exchanger (2) for cooling refrigerant, which is penetrated by a refrigerant duct (3) for refrigerant and a coolant duct (4) for coolant, having a collector (11) for drying and storing refrigerant, which is penetrated by a storage duct for refrigerant and comprises a connecting flange (15) for the heat exchanger (2), wherein in the assembled state of the heat exchanger module (1) the collector (11) with its connecting flange (15) is directly or indirectly supported on the heat exchanger (2) and the storage duct is connected to the refrigerant duct (3) in a fluidically communicating manner, characterised in that on the connecting flange (15) at least one groove (17*a*, 17*b*, 36) for conducting refrigerant is provided.

Numbered Paragraph 2. The heat exchanger module (1) according to Numbered Paragraph 1, characterised in that the at least one groove (17*a*, 17*b*, 36) has at least one of the following features:

it is realised by a longitudinal groove, it extends at least in portions or exclusively parallel to a height direction (23) defined by an edge (22) of the connecting flange (15), it extends at least in portions or exclusively parallel to a height direction (23) defined by an edge (22) of the connecting flange (15), wherein a groove length (24) of the at least one groove (17*a*, 17*b*, 36) running parallel to the height direction (23) amounts to between 50% to 90% of a height (25) of the connecting flange (15) viewed in the height direction (23), it extends at least in portions or exclusively, at an angle or transversely to a height direction (23) defined by an edge (22) of the connecting flange (15).

Numbered Paragraph 3. The heat exchanger module (1) according to either of Numbered Paragraphs 1 or 2, characterised in that the storage duct of the collector (11), on a connecting surface (14) of the collector (11) formed by the connecting flange (15), comprises collector duct openings (13*a*, 13*b*), wherein at least one collector duct opening (13*a*, 13*b*) is realised by a groove opening (18*a*, 18*b*) of the at least one groove (17*a*, 17*b*).

Numbered Paragraph 4. The heat exchanger module (1) according to Numbered Paragraph 3, characterised in that at least one further collector duct opening (13*a*, 13*b*) of the collector (11) is realised by a circular opening (27) of a bore (26).

Numbered Paragraph 5. The heat exchanger module (1) according to any one of the Numbered Paragraphs 3 or 4, characterised in that at least one further collector duct opening (13*a*, 13*b*) of the collector (11) is realised by a groove opening (18*a*, 18*b*) of a further groove (17*a*, 17*b*).

Numbered Paragraph 6. The heat exchanger module (1) according to Numbered Paragraph 5, characterised in that the said grooves (17*a*, 17*b*) have at least one of the following features:

they are at least in portions or exclusively parallel to one another, they are different in length, they each extend at least in portions or exclusively parallel to a height direction (23) defined by an edge (22) of the connecting flange (15), they extend at least in portions or exclusively parallel to a height direction (23) defined by an edge (22) of the connecting flange (15), wherein a groove length (24) of the one, first groove (17*a*) running parallel to the height direction (23) amounts to more than 70% of a height (25) of the connecting flange (15) viewed in the height direction (23), wherein a groove length (24) of the other, second groove (17*b*) running parallel to the height direction (23) amounts to less than 70% of a height (25) of the connecting flange (15) viewed in the height direction (23), they extend at least in portions or exclusively at an angle or transversely to a height direction (23) defined by an edge (22) of the connecting flange (15).

Numbered Paragraph 7. The heat exchanger module (1) according to any one of the preceding Numbered Paragraphs, characterised in that at least one structural dimension of the at least one groove (17*a*, 17*b*, 36), in particular a groove length (24) and/or a groove width, is realised depending on a connecting pattern of the heat exchanger (2) realised by a mounting surface (10) of the heat exchanger (2) for mounting the collector (11) a by transfer opening (9*a*, 9*b*) of the refrigerant duct (3) opening out there.

Numbered Paragraph 8. The heat exchanger module (1) according to any one of the preceding Numbered Paragraphs, characterised in that the heat exchanger (2) comprises a stack (30) of plate discs (32) stacked onto one another in a stack direction (31), wherein the at least one groove (17*a*, 17*b*, 36) runs orthogonally to the stack direction (31) and parallel to a longitudinal centre axis (19) of the collector (11).

Numbered Paragraph 9. The heat exchanger module (1) according to any one of the preceding Numbered Paragraphs, characterised in that in the assembled state of the heat exchanger module (1), at least one further groove (17*a*, 17*b*, 36) forms an outlet groove (36) of the collector (11) fluidically communicating with the refrigerant duct (3) of the heat exchanger (2) through which refrigerant can flow out of the refrigerant duct (3) of the heat exchanger (2).

Numbered Paragraph 10. A motor vehicle having an air-conditioning system or a heat pump system with a heat exchanger module (1) according to any one of the Numbered Paragraphs 1 to 9.

The invention claimed is:

1. A heat exchanger module for an air-conditioning system or a heat pump system, comprising:

a heat exchanger for cooling a refrigerant, which is penetrated by a refrigerant duct for refrigerant and a coolant duct for coolant, having a collector for drying and storing refrigerant, which is penetrated by a storage duct for refrigerant and comprises a connecting flange for the heat exchanger, wherein in an assembled state of the heat exchanger module the connecting flange is directly or indirectly supported on the heat exchanger and the storage duct is connected to the refrigerant duct in a fluidically communicating manner, wherein at least one groove is provided on the connecting flange for conducting refrigerant, and wherein a primary flow path of the refrigerant through the heat exchanger manifold is formed along a first two-dimensional axis, wherein the primary flow path formed along the first two-dimensional axis is substantially parallel to a longitudinal central axis of the collector.

2. The heat exchanger module according to claim 1, wherein the at least one groove has at least one of the following features:

the at least one groove extends longitudinally, the at least one groove extends at least in portions or exclusively parallel to a height direction defined by an edge of the connecting flange, the at least one groove extends at least in portions or exclusively parallel to a height direction defined by an edge of the connecting flange, wherein a groove length of the at least one groove running parallel to the height direction amounts to between 50% to 90% of a height of the connecting flange viewed in the height direction, or the at least one groove extends at least in portions or exclusively, at an angle or transversely to a height direction defined by an edge of the connecting flange.

3. The heat exchanger module according to claim 1, wherein the storage duct of the collector, on a connecting surface of the collector formed by the connecting flange, comprises at least one collector duct opening.

4. The heat exchanger module according to claim 3, wherein the at least one collector duct opening is a circular opening of a bore.

5. The heat exchanger module according to claim 3, wherein the at least one collector duct opening further comprises a plurality of grooves.

6. The heat exchanger module according to claim 5, wherein the plurality of grooves have at least one of the following features:

individual grooves of the plurality of grooves are at least in portions or exclusively parallel to one another, individual grooves of the plurality of grooves are different in length, individual grooves of the plurality of grooves each extend at least in portions or exclusively parallel to a height direction defined by an edge of the connecting flange, individual grooves of the plurality of grooves extend at least in portions or exclusively parallel to a height direction defined by an edge of the connecting flange, wherein an individual groove length of a first groove running parallel to the height direction amounts to more than 70% of a height of the connecting flange viewed in the height direction, wherein an individual groove length of a second groove running parallel to the height direction amounts to less than 70% of a height of the connecting flange viewed in the height direction, or individual grooves of the plurality of grooves extend at least in portions or exclusively at an angle or transversely to a height direction defined by an edge of the connecting flange.

7. The heat exchanger module according to claim 1, wherein a groove length and/or a groove width of the at least one groove, is realised depending on a connecting pattern of the heat exchanger realised by a mounting surface of the heat exchanger for mounting the collector by a transfer opening of the refrigerant duct opening.

8. The heat exchanger module according to claim 1, wherein the heat exchanger comprises a stack of plate discs stacked onto one another in a stack direction, wherein the at least one groove runs orthogonally to the stack direction and parallel to a longitudinal centre axis of the collector.

9. The heat exchanger module according to claim 1, wherein in the assembled state of the heat exchanger module, the at least one groove further comprises at least a second groove which forms an outlet groove of the collector fluidically communicating with the refrigerant duct of the heat exchanger through which refrigerant can flow out of the refrigerant duct of the heat exchanger.

10. A motor vehicle having an air-conditioning system or a heat pump system with a heat exchanger module according to claim 1.

11. A heat exchanger module for an air-conditioning system or a heat pump system, comprising:

a heat exchanger for cooling a refrigerant, which is penetrated by a refrigerant duct for refrigerant and a coolant duct for coolant, having a collector for drying and storing refrigerant, which is penetrated by a storage duct for refrigerant and comprises a connecting flange for the heat exchanger, wherein in an assembled state of the heat exchanger module the connecting flange is supported on the heat exchanger and the storage duct is connected to the refrigerant duct in a fluidically communicating manner, wherein at least one grove is provided on the connecting flange for conducting refrigerant, wherein the heat exchanger is a condenser, and wherein the heat exchanger for cooling a refrigerant further comprises an inlet duct, wherein a primary flow path of the refrigerant through the heat exchanger manifold is formed along a first two-dimensional axis, wherein the primary flow path formed along the first two-dimensional axis is substantially parallel to a longitudinal central axis of the collector.

12. The heat exchanger module for an air-conditioning system or a heat pump system of claim 11, wherein the inlet duct further comprises a straight inlet duct.

13. The heat exchanger module for an air-conditioning system or a heat pump system of claim 11, wherein the inlet duct further comprises an angled inlet duct.

14. A heat exchanger module for an air-conditioning system or a heat pump system in a motor vehicle, comprising:

a heat exchanger for cooling a refrigerant, which is penetrated by a refrigerant duct for refrigerant and a coolant duct for coolant, having a collector for drying and storing refrigerant, which is penetrated by a storage duct for refrigerant and comprises a connecting flange for the heat exchanger, wherein in an assembled state of the heat exchanger module the connecting flange is directly or indirectly supported on the heat exchanger and the storage duct is connected to the refrigerant duct in a fluidically communicating manner, wherein at least one groove is provided on the connecting flange for conducting refrigerant, wherein a flow path of the refrigerant through the heat exchanger is substantially parallel to a longitudinal central axis of the collector, wherein the at least one groove comprises one or more of the following features:

the at least one groove is realised by a longitudinal groove, the at least one groove extends at least in portions or exclusively parallel to a height direction defined by an edge of the connecting flange, the at least one groove extends at least in portions or exclusively parallel to a height direction defined by an edge of the connecting flange, wherein a groove length of the at least one groove running parallel to the height direction amounts to between 50% to 90% of a height of the connecting flange viewed in the height direction, or the at least one groove extends at least in portions or exclusively, at an angle or transversely to a height direction defined by an edge of the connecting flange, wherein the storage duct is disposed on a connecting surface of the collector formed by the connecting flange and comprises collector duct openings, wherein at least one further collector duct opening of the collector is defined by a circular opening of a bore, wherein at least one further collector duct opening of the collector is defined by a groove opening of at least one further groove of a plurality of grooves, wherein the at least one further groove of a plurality of grooves comprises at least one of the following features:

the at least one further grooves of the plurality of grooves are at least in portions or exclusively parallel to one another, the at least one further grooves of the plurality of grooves are different in length, the at least one further grooves of the plurality of grooves each extend at least in portions or exclusively parallel to a height direction defined by an edge of the connecting flange, the at least one further grooves of the plurality of grooves extend at least in portions or exclusively parallel to a height direction defined by an edge of the connecting flange, wherein a groove length of a first groove running parallel to the height direction amounts to more than 70% of a height of the connecting flange viewed in the height direction, wherein a groove length of a second groove running parallel to the height direction amounts to less than 70% of a height of the connecting flange viewed in the height direction, or the at least one further groove of the plurality of grooves extend at least in portions or exclusively at an angle or transversely to a height direction defined by an edge of the connecting flange, wherein at least one structural dimension of the at least one groove, is realised depending on a connecting pattern of the heat exchanger defined by a mounting surface of the heat exchanger for mounting the collector by a transfer opening of the refrigerant duct opening, wherein the heat exchanger comprises a stack of plate discs stacked onto one another in a stack direction, wherein the at least one groove runs orthogonally to the stack direction and parallel to a longitudinal centre axis of the collector, and wherein in the assembled state of the heat exchanger module, the at least one further groove forms an outlet groove of the collector fluidically communicating with the refrigerant duct of the heat exchanger through which refrigerant can flow out of the refrigerant duct of the heat exchanger, wherein a primary flow path of the refrigerant through the heat exchanger manifold is formed along a first two-dimensional axis, wherein the primary flow path formed along the first two-dimensional axis is substantially parallel to a longitudinal central axis of the collector.

* * * * *